United States Patent [19]
Miyazaki et al.

[11] Patent Number: 5,325,256
[45] Date of Patent: Jun. 28, 1994

[54] CARTRIDGE HAVING A WRITE PROTECTOR INTEGRALLY FORMED WITH THE CASING

[75] Inventors: Yukio Miyazaki, Saku; Haruo Shiba, Komoro; Masaru Ikebe, Saku, all of Japan

[73] Assignee: TDK Corporation, Tokyo, Japan

[21] Appl. No.: 967,733

[22] Filed: Oct. 28, 1992

[30] Foreign Application Priority Data

Nov. 1, 1991 [JP] Japan .................... 3-97671[U]
Jun. 1, 1992 [JP] Japan .................... 4-43081[U]

[51] Int. Cl.$^5$ .................... G11B 15/04; G11B 23/02
[52] U.S. Cl. .................... 360/132; 360/60; 360/133
[58] Field of Search .................... 360/133, 60, 132; 369/291

[56] References Cited

U.S. PATENT DOCUMENTS

| | | | |
|---|---|---|---|
| 4,460,930 | 7/1984 | Takahashi | 360/60 |
| 5,073,889 | 12/1991 | Rayner | 360/133 |
| 5,121,279 | 6/1992 | Saeki et al. | 360/133 |
| 5,155,647 | 10/1992 | Otani | 360/133 |

FOREIGN PATENT DOCUMENTS 63-43643 11/1988 Japan .

Primary Examiner—John H. Wolff
Assistant Examiner—Kevin M. Watkins
Attorney, Agent, or Firm—Oblon, Spivak, McClelland, Maier & Neustadt

[57] ABSTRACT

A disk cartridge wherein a record medium is accommodated in a casing composed of an upper casing and a lower casing, and slidably attached with a write protector for opening and closing a detection opening for preventing an erroneous erasure of signals in the record medium characterized in that the write protector is integrally formed in a first one of the upper casing and the lower casing connected to the first one through a connecting portion; and guide walls for stoppers provided at upper portions of the write protector and a closed portion of the detection opening for sliding the write protector, are attached to a second one of the upper casing and the lower casing.

11 Claims, 7 Drawing Sheets

CARTRIDGE HAVING A WRITE PROTECTOR INTEGRALLY FORMED WITH THE CASING

BACKGROUND OF THE INVENTION

Field of the Invention

This invention relates to a disk cartridge which rotatably accommodates a disk-like medium as an information record carrier such as a flexible disk, a hard disk and especially an optical disk in a casing.

Discussion of Background

A conventionally employed disk cartridge such as a floppy disk is provided with a mechanism for preventing an erroneous erasure so that recorded signals are not erroneously erased.

For instance, a detection opening is formed in the disk cartridge, and a write protector which opens and closes the detection hole for preventing the erroneous erasure of signals is formed by a member which is different from that of a casing. The write protector is slidably fitted to the detection hole and can be disposed both at a recordable position and an unrecordable position.

The mechanism for preventing an erroneous erasure of signals employed in the conventional disk cartridge, is provided with an integrated structure wherein the write protector and the casing are composed of different parts which are fitted with each other. Accordingly, the number of parts thereof is increased, the integration performance thereof is poor, enhancing the productivity thereof is limited, the production cost thereof is increased and the reliability thereof is problematic.

SUMMARY OF THE INVENTION

It is an object of the present invention to avoid substantively the shortcoming of the conventional disk cartridge, and to provide a disk cartridge wherein the cost reduction thereof is achieved by reducing the number of parts, the integration performance thereof is improved, the production operability ratio is considerably enhanced, and the maintenance of the write protector is easy and which is durable and reliable.

According to an aspect of the present invention, there is provided a disk cartridge wherein a record medium is accommodated in a casing composed of an upper casing and a lower casing, and slidably attached with a write protector for opening and closing a detection opening for preventing an erroneous erasure of signals in said record medium characterized by that:

the write protector is integrally formed in a first one of the upper casing and the lower casing connected to the first one through a connecting portion; and
guide walls for stoppers provided at upper portions of the write protector and a closed portion of said detection opening for sliding the write protector, are attached to a second one of the upper casing and the lower casing.

When signals are to be recorded on a record medium 3 in the disk cartridge, a write protector 5 engaged with a detection hole 4 is maintained at a recordable position on one end side thereof by a stopper piece 10. When the signals recorded on the record medium 3 are not to be erased erroneously, the write protector 5 is slid along guide walls 8 of an upper casing 1 while a connecting portion 6 is being bent, the write protector 5 being connected to a lower casing 2 by the connecting portion 6. The write protector 5 moves to the other end side getting over the stopper piece 10 and further getting over a stopper piece 11 and is located at an unrecordable position.

Accordingly, even when a user erroneously sets the disk cartridge and operates a record button, the recording is not performed. Therefore, the already recorded signals are not erased. In this way, the presence or absence of the write protector 5 located in the detection opening 4 is detected by a detector on the side of a record reproducing device, based on which the recording operation is controlled.

DETAILED DESCRIPTION OF THE PREFERRED EMBODIMENT

Figure 1:
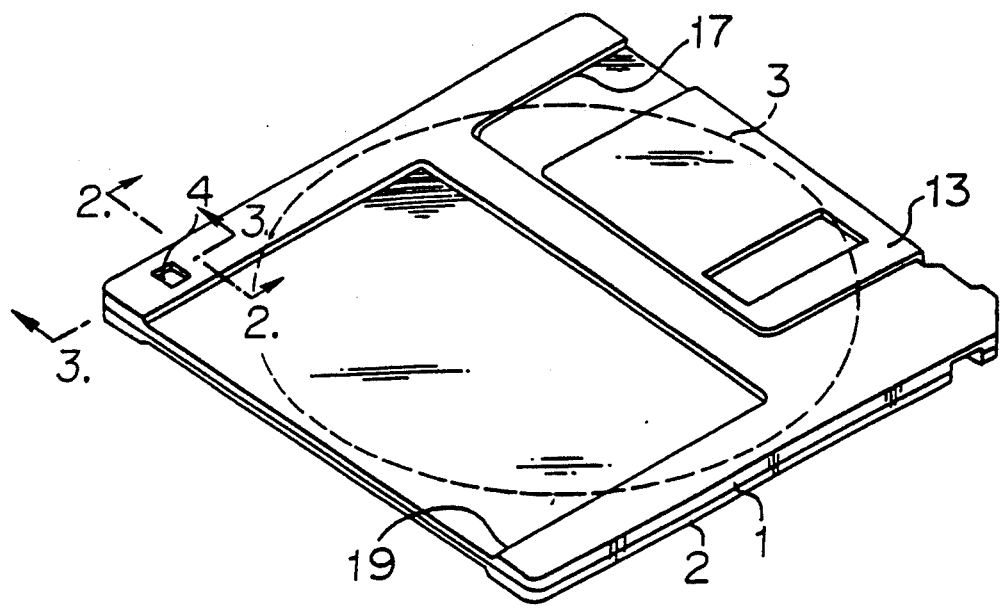
FIG. 1 is a perspective view of a total of an embodiment according to the present invention.
Figure 2:
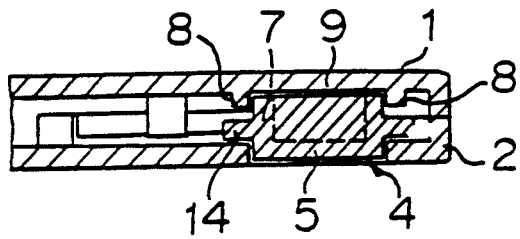
FIG. 2 is an enlarged longitudinal sectional diagram taken along a line A—A of FIG. 1.
Figure 3:
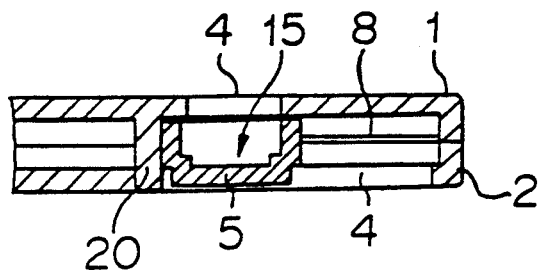
FIG. 3 is an enlarged longitudinal sectional diagram taken along a line B—B of FIG. 1.
Figure 4:
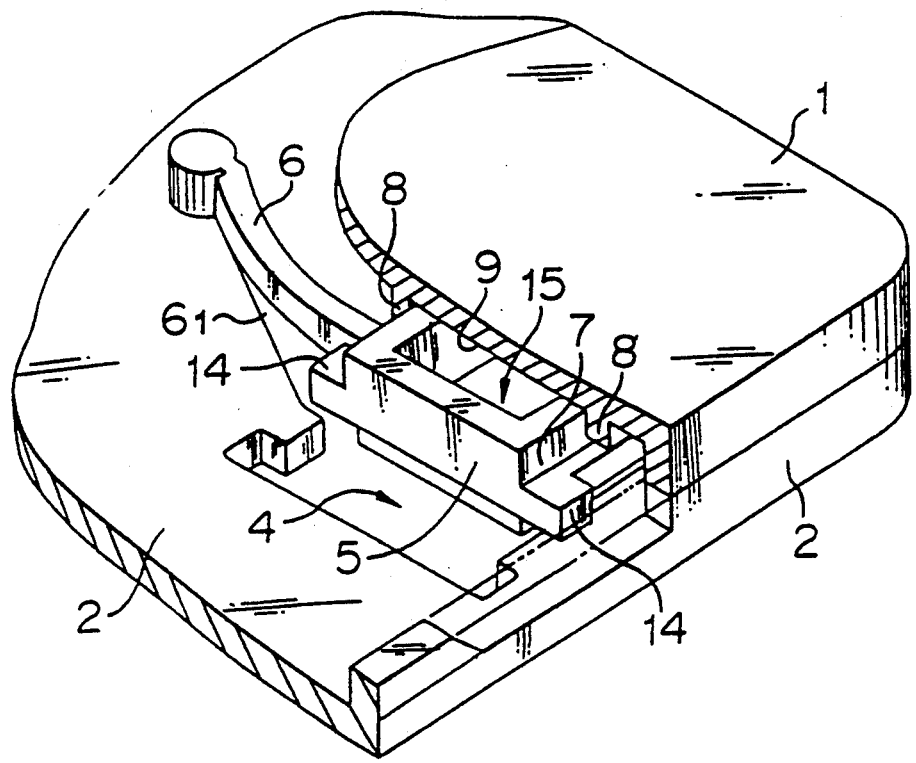
FIG. 4 is a partially cut enlarged perspective diagram showing a write protector of the embodiment.

Explanation will be given to an embodiment wherein this invention is applied to a floppy disk cartridge in reference to FIGS. 1 through 12. The disk cartridge is provided with a disk-like flexible disk 3 which is a record medium, a casing for accommodating the disk 3, composed of an upper casing 1 and a lower casing 2, detection openings 4 provided in the casing for preventing an erroneous erasure of signals, and a write protector 5 slidably provided for opening and closing the detection holes 4. The write protector 5 is integrally formed to the lower case 2 which is connected to the lower case 2 through a connecting portion 6. Guide walls 8 for stoppers 7 provided at upper portions of the write protector 5 and an enclosed portion 9 of the detection opening 4 for sliding the write protector 5, are provided in the upper casing 1.

The write protector 5 is integrally formed at the same time when the detection opening 4 of the lower casing 2 is formed. An as-formed position thereof is determined to be the recordable position. The write protector 5 is integrally formed at the lower casing 2 along with the connecting portion 6 and a drawn-off portion $6_1$ of the connecting portion 6. Furthermore, protrusions 14 extended on the both sides of an end of the write protector 5 are provided at the write protector 5 which serve as a drop-off preventive structure whereby the write protector 5 does not drop off from the detection opening 4.

The write protector 5 may be provided on the upper casing 1 instead of the lower casing 2. In that case, the lower casing 2, corresponding with the arrangement, may be of a construction complying with a relative positional relationship with other parts similar to the above example.

Figure 5:
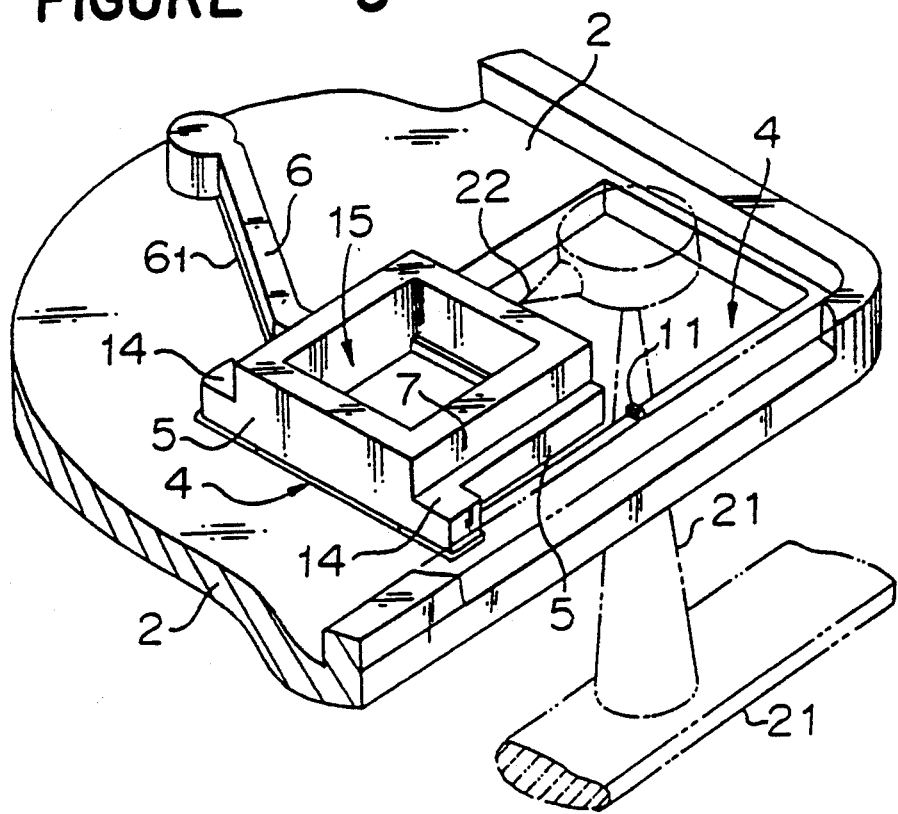
FIG. 5 is an enlarged perspective diagram of a portion of a lower casing wherein an upper casing in the embodiment shown in FIG. 4 is removed.
Figure 6:
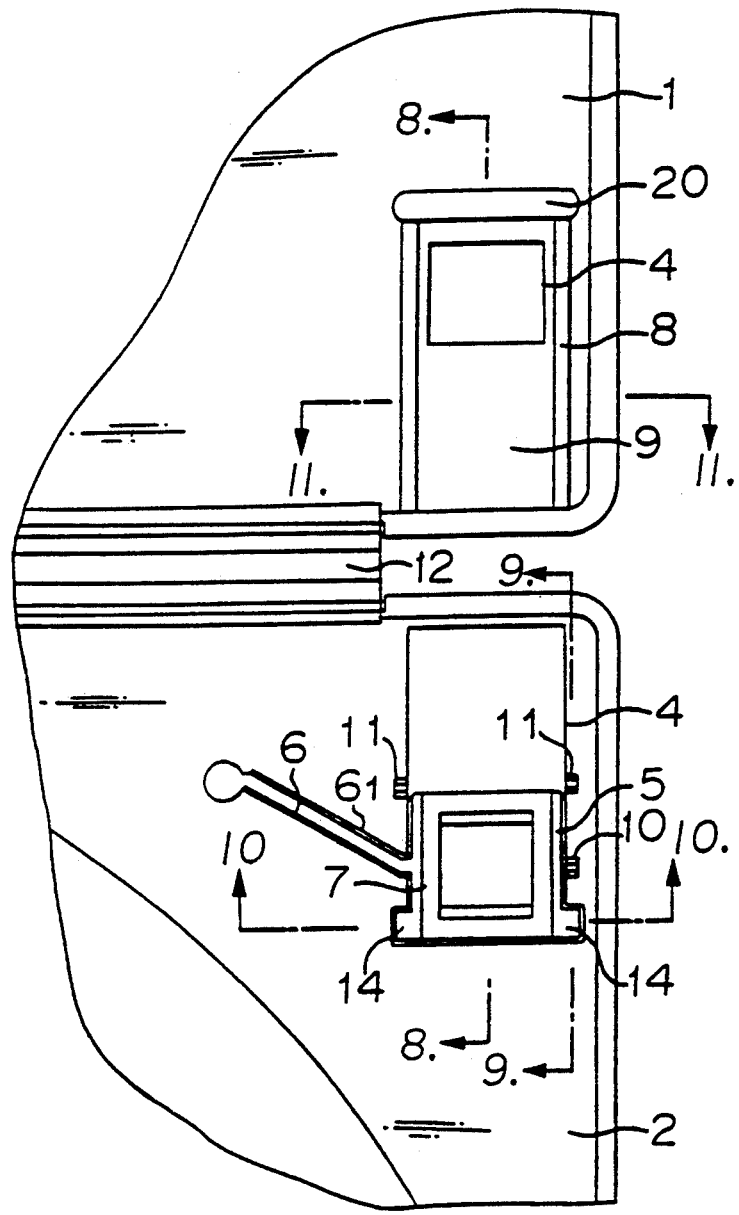
FIG. 6 is an enlarged plan view showing an expanded state of an inner portion of the embodiment.
Figure 7:
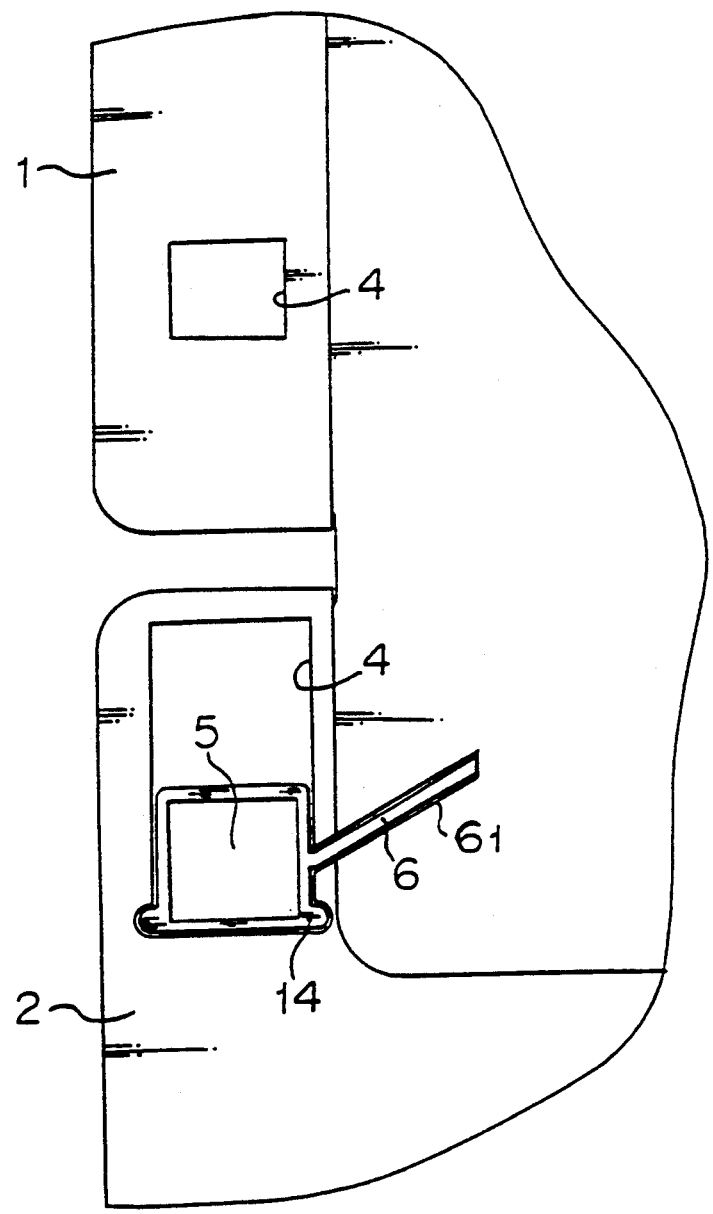
FIG. 7 is an outer surface diagram showing an outer portion of the embodiment shown in FIG. 6.
Figure 8:
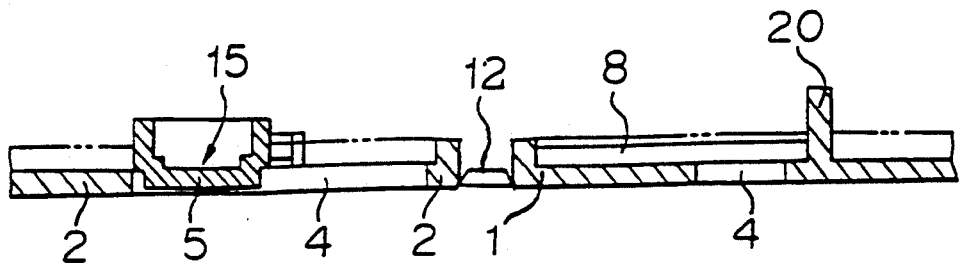
FIG. 8 is a longitudinal sectional diagram taken along a line C—C of FIG. 6.
Figure 9:
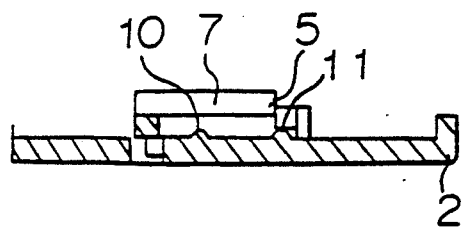
FIG. 9 is a longitudinal sectional diagram taken along a line D—D of FIG. 6.
Figure 10:
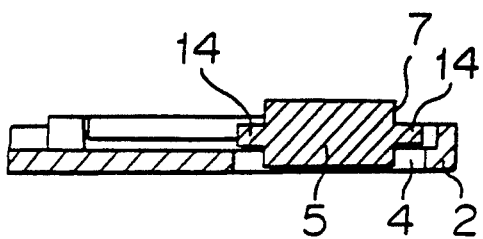
FIG. 10 is a longitudinal sectional diagram taken along a line E—E of FIG. 6.
Figure 11:
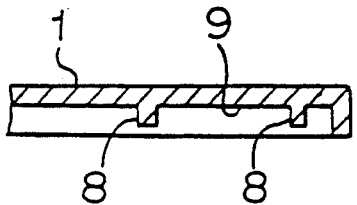
FIG. 11 is a longitudinal sectional diagram taken along a line F—F of FIG. 6.
Figure 12:
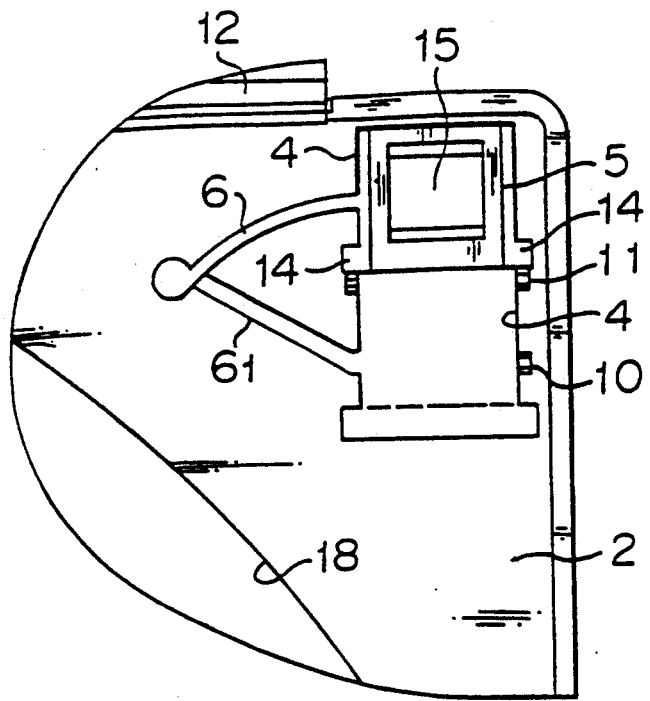
FIGS. 12A and 12B are plan views showing operating states of the write protector in the embodiment shown in FIG. 5, wherein FIG. 12A designates a recordable position and 12B, a state wherein the write protector moves to an unrecordable position.
Figure 12:
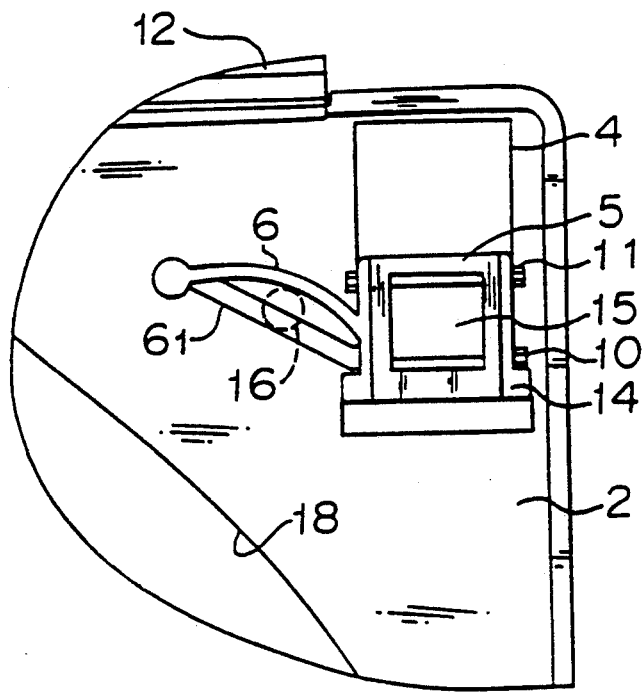

The write protector 5 is constituted by a slider piece having a recess 15 on the side of an upper face thereof and is connected to the lower casing 2 by integrally forming the arm-like connecting portion 6 on one side thereof. In this construction, the connecting portion 6 is urged to return to the as-formed state by an elastic force caused by its bending. Furthermore, the upper casing 1 may be provided with a pin 16 which contacts the connecting portion 6 in a slidable range of the write protector 5 for alleviating the force by which the write protector 5 returns to the as-formed state, and converts the direction of the urging force, thereby changing a sense of the force exerted on the write protector at the unrecordable position. As shown in FIG. 5, to integrally form the write protector 5 in a first casing, for example, the lower casing 2 or the upper casing 1, a mold structure may preferably be employed wherein an injection molding is performed from a gate 22 while a runner 21 for forming the write protector is inserted into the detection opening 4 formed on a second casing, in addition to a runner (not shown) for forming the main body of the casing.

When the casing combined with the upper casing 1 and the lower casing 2 is made of a synthetic resin such as polypropylene, an integral forming is performed employing a hinge 12 thereby connecting the upper and the lower casings. However, the upper casing 1 and the lower casing 2 may be formed by separate members.

In these Figures, a reference numeral 13 designates a shutter, and 17, a slide area for the shutter which is formed on the surface of the casing as a recessed face. A numeral 18 designates a recessed face for fitting a liner superposing the disk, which is formed on an inner face of the casing. A numeral 19 designates a labeling area which is formed on the surface of the casing as a recessed face. A numeral 20 designates a rib for preventing the dropping-off of the write protector, which is provided in a casing, for instance, the upper casing 1 and closes a portion of the detection opening 4 on the lower casing 2, that is, that on the side of the protrusions 14, and positions a closed position of the write protector.

Furthermore, this invention can be employed in an audio cassette tape which accommodates a tape-like medium as a record medium, instead of the disk cartridge in the above example, in a similar construction. In this way, it is not necessary to cut off a member for preventing an erroneous erasure of signals. Therefore, there is no trouble in the successive recording and the invented disk cartridge can conveniently be employed.

Figure 13:
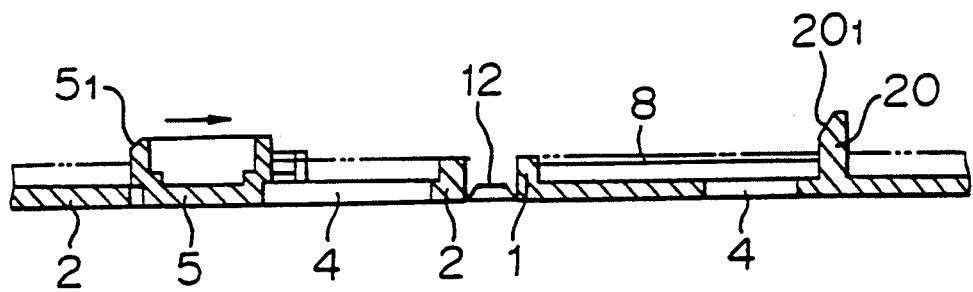
FIG. 13 is a partial longitudinal sectional diagram showing a write protector of another embodiment of this invention.

In an embodiment of FIG. 13, the upper casing 1 and the lower casing 2 are integrated by employing the hinge 12, for example, at side edge portions thereof, back edge portions of the labeling area thereof, or front edges on the other sides thereof, or ones of side wall portions of sides thereof orthogonal to the above back and front edges. The write protector provided in the lower casing 2, is to contact the rib 20 for preventing the dropping-off of the write protector protrudingly provided in the upper casing 2. Since tapered faces $5_1$ and $20_1$ are provided respectively on the write protector 5 and the rib 20 at their edge portions for butting the write protector 5 and the rib 20, when the upper and lower casings are combined by superposing them, the write protector is automatically moved to the contact position. Therefore, it is not necessary to positively move the write protector 5, and setting of the write protector to the contact position is easy. Accordingly the productivity of the disk cartridge can be enhanced.

In this invention, the write protector of the record medium for preventing an erroneous erasure of signals is integrally formed to a casing thereof continuously thereto through the connecting portion. The guide walls for the stoppers provided at upper portions of the write protector, and the closed portion of the detection opening for sliding the write protector are provided at the other casing. Accordingly, this invention is provided with practical effects, wherein the number of parts is reduced, the integration performance thereof is improved, the production thereof is performed at a lower cost, the production operability ratio is considerably elevated, the retaining of the write protector to the casing is performed with high accuracy, the handling thereof is smooth and convenient and the durability and the reliability thereof are considerable.

What is claimed is:

1. A cartridge for accommodating a recording medium comprising:

a casing composed of an upper casing and a lower casing, and slidably attached with a write protector for opening and closing a detection opening for preventing an erroneous erasure of signals in said recording medium;

wherein the write protector is integrally formed in a first one of the upper casing or the lower casing and connected to the first one through a connecting portion, said connecting portion including a first end connected to said first one and a second end permanently connected to said write protector; and guide walls for stoppers provided at upper portions of the write protector and an enclosed portion of said detection opening for sliding the write protector, are attached to a second one of the upper casing or the lower casing, and wherein said second end of said connecting portion moves with said write protector during sliding movement of said write protector while maintaining the integral connection between the write protector and the first one.

2. The cartridge according to claim 1, wherein the write protector is provided with extended protrusions for preventing dropping-off thereof from the detection opening.

3. The cartridge according to claim 1 or claim 2, wherein the write protector is formed into a slider piece having a recess portion and said connecting portion comprises an arm-like connecting portion integrally formed on a side of the write protector.

4. The cartridge according to claim 2, wherein the upper casing is provided with a pin contacting the connecting portion in a sliding range of the write protector and converting a direction of an urging force thereof.

5. The cartridge according to claim 4, wherein the upper casing is provided with a rib for preventing the dropping-off of the write protector so that the rib closes a portion of the detection opening and positions the write protector at a closed position thereof.

6. The cartridge according to claim 2, wherein the upper casing is provided with a rib for preventing the dropping-off of the write protector so that the rib closes a portion of the detection opening and positions the write protector at a closed position thereof.

7. The cartridge according to claim 6, wherein the write protector is to contact said rib for preventing the dropping-off of the write protector protrudingly provided in the upper casing and tapered faces are provided respectively at portions of the write protector and the rib for butting the write protector and the rib.

8. The cartridge according to claim 3, wherein the upper casing is provided with a pin contacting the connecting portion in a sliding range of the write protector and converting a direction of an urging force thereof.

9. The cartridge according to claim 3, wherein the upper casing is provided with a rib for preventing the dropping-off of the write protector so that the rib closes a portion of the detection opening and positions the write protector at a closed position thereof.

10. A cartridge for a recording medium, comprising:
a casing for accommodating a recording medium, said casing including a detection opening;
a slidably mounted write protector disposed in said casing for opening and closing the detection opening for preventing an erroneous erasure of signals in said recording medium, said slidably mounted write protector slidable between a first position at which said detection opening is closed and a second position at which said detection opening is open; and
a connector providing a connection between said slidably mounted write protector and said casing, said connector including a first end fixedly connected to said casing and a second end connected to said slidably mounted write protector, with said second end movable with said slidably mounted write protector during movement of said slidably mounted write protector between said first and second positions while maintaining the fixed connection between said slidably mounted write protector and said casing.

11. The cartridge of claim 10, wherein said connector includes an elastically bendable arm, and wherein said elastically bendable arm is connected at said first end such that said elastically bendable arm is elastically bent at least when said slidably mounted write protector is in one of said first and second positions, and further wherein when said slidably mounted write protector is in said one of said first and second positions said elastically bent arm imparts an elastic force to said slidably mounted write protector to urge the slidably mounted write protector toward the other of said first and second positions.

* * * * *